(12) United States Patent
Ruan (10) Patent No.: US 12,035,842 B1
(45) Date of Patent: Jul. 16, 2024

(54) PORTABLE MILK WARMING CONTAINER

(71) Applicant: Hangzhou Moxiang Cross-border E-Commerce Co., Ltd., Zhejiang (CN)

(72) Inventor: Xueqing Ruan, Zhejiang (CN)

( * ) Notice: Subject to any disclaimer, the term of this patent is extended or adjusted under 35 U.S.C. 154(b) by 0 days.

(21) Appl. No.: 18/385,917

(22) Filed: Nov. 1, 2023

(30) Foreign Application Priority Data

Aug. 3, 2023 (CN) .......................... 202322074984.5

(51) Int. Cl.
*A47J 36/24* (2006.01)

(52) U.S. Cl.
CPC ................................ *A47J 36/2433* (2013.01)

(58) Field of Classification Search
None
See application file for complete search history.

(56) References Cited

U.S. PATENT DOCUMENTS

| | | | | |
|---|---|---|---|---|
| 3,432,641 | A * | 3/1969 | Welke | A47J 36/2433 219/415 |
| 11,395,559 | B2 * | 7/2022 | Alexander | A47J 36/2433 |
| 2006/0081599 | A1 * | 4/2006 | Anderson | A47J 36/2433 219/438 |
| 2008/0087270 | A1 * | 4/2008 | Shaikh | F28D 20/028 215/11.1 |
| 2011/0062149 | A1 * | 3/2011 | Driel | A47J 36/2433 219/618 |
| 2015/0165402 | A1 * | 6/2015 | King | B01F 35/32025 366/145 |
| 2016/0242598 | A1 * | 8/2016 | Alexander | H05B 3/06 |
| 2018/0153342 | A1 * | 6/2018 | Gostelow | A47J 36/2466 |
| 2018/0249863 | A1 * | 9/2018 | Moksin | F24C 7/10 |
| 2018/0255966 | A1 * | 9/2018 | Moore | A47J 36/2433 |
| 2019/0231121 | A1 * | 8/2019 | Alexander | A47J 36/2438 |
| 2021/0007547 | A1 * | 1/2021 | Moksin | A47J 36/32 |
| 2022/0218143 | A1 * | 7/2022 | Schlack | A61J 9/005 |
| 2023/0225550 | A1 * | 7/2023 | Johnson | A47J 36/2411 165/80.5 |
| 2023/0397761 | A1 * | 12/2023 | Rose | A47G 19/2272 |
| 2023/0414036 | A1 * | 12/2023 | Lu | A47J 27/004 |
| 2024/0049908 | A1 * | 2/2024 | Xu | A47J 36/2433 |

FOREIGN PATENT DOCUMENTS

| | | | | |
|---|---|---|---|---|
| CN | 107669142 | A * | 2/2018 | ......... A47J 36/2433 |
| CN | 211748960 | U * | 10/2020 | |
| CN | 217907389 | U * | 11/2022 | |
| WO | WO-2019080398 | A1 * | 5/2019 | ......... A47J 36/2433 |
| WO | WO-2021022329 | A1 * | 2/2021 | |

* cited by examiner

*Primary Examiner* — Joseph M. Pelham (57) ABSTRACT

A portable milk warming container, having a main device and a heating device. The heating device has a heating casing, a heating element, and a first coupling socket. The main device has a casing of the main device, a power supply component, a control circuit board, and a second coupling socket coupled to the first coupling socket. The heating device can be detached from the main device.

19 Claims, 7 Drawing Sheets

PORTABLE MILK WARMING CONTAINER

TECHNICAL FIELD

This utility model relates to the field of milk warmers, particularly to a portable milk warming container.

BACKGROUND OF THE INVENTION

Milk warming containers are mainly used to heat frozen or refrigerated breast milk to a temperature suitable for feeding infants. They can also be used to heat cold water to a temperature suitable for brewing powdered milk, as well as to heat other liquids such as cow's milk. Traditional milk warmers generally include a heating unit and a cover placed on the heating unit. An upper side of the heating unit is equipped with a heating chamber capable of accommodating water and a milk bottle. By heating the water in the heating chamber, heat is transferred to the liquid in the bottle, thereby achieving the effect of heating the liquid in the bottle. These milk warmers require an AC power source and cannot be used outdoors, which is inconvenient when people need to feed infants outdoors.

In view of the above technical problems, a utility model patent titled Multifunctional Portable Intelligent Milk Warmer was granted in China on Nov. 29, 2022 (Publication No.: CN217907389U). It includes a connection seat; a heating element, a control circuit board, and a battery pack are also provided inside the connection seat. A top of the connection seat is equipped with a heating chamber, and the heating element is positioned at a bottom of the heating chamber. The heating chamber can be connected to a threaded opening of a milk bottle. This technical solution allows heating the liquid in the heating chamber and the milk bottle through the heating element. The built-in battery pack provides power supply for the milk warmer, making it convenient for outdoor use. Although only the heating chamber comes into contact with the liquid in the milk bottle during use, the entire connection seat needs to be cleaned, which can easily result in water entering the connection seat and coming into contact with electrical components such as a control circuit board or the battery pack, posing risks of short circuits or disconnections. Additionally, due to the presence of electrical components such as the battery pack inside the connection seat, the milk warmer cannot undergo high-temperature sterilization, making it inconvenient for thorough cleaning of the heating chamber.

BRIEF SUMMARY OF THE INVENTION

This utility model relates to a portable milk warming container, which addresses the shortcomings in the existing technology by providing a removable heating device that can be separated from the main device for individual cleaning or partial high-temperature disinfection. This allows for deep cleaning of the heating chamber, ensuring safer and more hygienic use.

This utility model discloses a portable milk warming container, comprising a main device and a heating device detachably connected to the main device; said heating device comprises a heating casing, a heating element arranged inside the heating casing, and a first coupling socket electrically connected to the heating element; an outer periphery of said heating element is surrounded by the heating casing; a heating chamber configured to be in contact with liquid inside an external container during use is provided within a space defined by the heating element and the heating casing; said main device comprises a casing of the main device, a power supply component inside the casing of the main device, a control circuit board, and a second coupling socket electrically connected to the power supply component and the control circuit board; said first coupling socket and the second coupling socket are coupled and connected when the heating device is docked with the main device, and are disconnected when the heating device is separated from the main device.

Preferably, said first coupling socket is provided with at least one first coupling pin, and said heating casing is provided with at least one first coupling channel through which a corresponding first coupling pin passes; said second coupling socket is provided with at least one second coupling pin corresponding to said at least one first coupling pin, and said casing of the main device is provided with at least one second coupling channel through which a corresponding second coupling pin passes.

When the heating device is docked to the main device, the first coupling socket and the second coupling socket are coupled together as each first coupling pin is in contact with a corresponding second coupling pin. When the heating device is separated from the main device, the first coupling socket and the second coupling socket are disconnected as each first coupling pin is separated from a corresponding second coupling pin.

Preferably, each first coupling pin is sealedly connected to an inner wall of a corresponding first coupling channel, and an inner wall of the heating casing is provided with a first coupling seat for mounting the first coupling socket; each second coupling pin is sealedly connected to an inner wall of a corresponding second coupling channel, and an inner wall of the casing of the main device is provided with a second coupling seat for mounting the second coupling socket.

Preferably, said heating casing is provided with at least one first magnetic fastener; said casing of the main device is provided with at least one second magnetic fastener corresponding to said at least one first magnetic fastener; the heating device and the main device are docked as said at least one first magnetic fastener is magnetically connected to said at least one second magnetic fastener.

Preferably, the inner wall of the heating casing is provided with at least one first magnetic fastener seat for mounting said at least one first magnetic fastener. The inner wall of the casing of the main device is provided with at least one second magnetic fastener seat for mounting said at least one second magnetic fastener; said at least one first magnetic fastener comprises at least two first magnetic fasteners, and said at least one first magnetic fastener seat comprises at least two first magnetic fastener seats corresponding to said at least two first magnetic fasteners, and said at least two first magnetic fastener seats are evenly arranged around the first coupling seat.

Preferably, said heating element is provided with a temperature sensor electrically connected to the first coupling socket; said temperature sensor is configured to detect a temperature of a liquid in the heating chamber; said heating casing is also provided with an overheating protector electrically connected to the temperature sensor, the heating element and the first coupling socket; the inner wall of the heating casing is provided with a protector seat for mounting the overheating protector; and/or Said heating element is provided with a water depletion sensor electrically connected to the first coupling socket; said water depletion sensor is configured to detect depletion of the liquid in the heating chamber.

Preferably, said first coupling socket is arranged underneath the heating element; said at least one first coupling channel penetrates through a bottom wall of the heating casing; said first coupling seat and said at least one first magnetic fastener seat are arranged on an upper side of the bottom wall of the heating casing; said at least one second coupling channel penetrates through a top wall of the casing of the main device; said second coupling seat and said at least one second magnetic fastener seat are arranged on a lower side of the top wall of the casing of the main device.

Preferably, the bottom wall of the heating casing comprises a first annular platform arranged along a periphery thereof, and a first docking platform protruding downwardly from an inner circumference of the first annular platform; the top wall of the casing of the main device comprises a second annular platform arranged along a periphery thereof, and a second docking platform concaved downwardly from an inner circumference of the second annular platform. When the heating device is docked with the main device, the first annular platform and the second annular platform are in full contact, and the first docking platform is limited within the second docking platform. The first coupling seat and said at least one first magnetic fastener seat are arranged on an upper side of the first docking platform, and the second coupling seat and said at least one second magnetic fastener seat are arranged on a lower side of the second docking platform; or the bottom wall of the heating casing comprises a first annular platform arranged along a periphery thereof and a first docking platform concaved upwardly from an inner circumference of the first annular platform; the top wall of the casing of the main device comprises a second annular platform arranged along a periphery thereof, and a second docking platform protruding upwardly from an inner circumference of the second annular platform. When the heating device is docked with the main device, the first annular platform and the second annular platform are in full contact, and the second docking platform is limited within the first docking platform. The first coupling seat and said at least one first magnetic fastener seat are arranged on an upper side of the first docking platform, and the second coupling seat and said at least one second magnetic fastener seat are arranged on a lower side of the second docking platform.

Preferably, the portable milk warming container further comprises a cover device for opening and closing the heating chamber; said cover device is detachably connected to the heating device.

Preferably, said cover device comprises a cover plate and a connecting column extending downwardly from the cover plate; said connecting column is provided with a connecting ring edge projecting outwardly from an outer peripheral side of the connecting column, and an inner peripheral side of an upper end of the heating chamber is provided with a limiting ring edge that protrudes inwardly into the heating chamber; said cover plate covers a top surface of the heating casing when the cover device is closed against the heating device. The connecting column extends into the heating chamber, and the connecting ring edge is connected to a lower side of the limiting ring edge by snap-fit connection; an inner side wall of the heating chamber is provided with a threaded structure configured to be removably connected to an external container opening or an adapter.

As the heating device and the main device of the portable milk warming container disclosed in this utility model can be detachably connected, and electrical components such as the power supply component and the control circuit board are arranged inside the casing of the main device, the heating device can be detached from the main device for separate cleaning or a certain degree of high-temperature disinfection. This facilitates deep cleaning of the heating chamber, making it safer and more hygienic use. The heating casing is provided with a first coupling socket, and the casing of the main device is provided with a second coupling socket. The first coupling socket is electrically connected to the heating element inside the heating casing, and the second coupling socket is electrically connected to the power supply component and the control circuit board inside the casing of the main device. The first coupling socket and the second coupling socket can be coupled and connected when the heating device is docked with the main device, thereby electrically connecting the heating element inside the heating casing with the power supply component and the control circuit board inside the casing of the main device. This allows the heating element to receive power from the power supply component and control on and off of heating, heating temperature, heating time, and other controls through the control circuit board. The first coupling socket and the second coupling socket can be disconnected when the heating device is separated from the main device. The structure is simple. It is convenient to dock and detach for ease of use.

Additional aspects and advantages of this utility model will be partially described below. Some part will become apparent from the following description or learned through use of the utility model.

BRIEF DESCRIPTION OF THE DRAWINGS

The accompanying drawings illustrated herein are used to provide a further understanding of this utility model and form part of this application. The schematic embodiments of this utility model and their illustrations are used to explain the utility model and do not constitute an improper limitation of the utility model. In the accompanying drawings.

DETAILED DESCRIPTION OF THE INVENTION

In order to make the purpose, technical solution, and advantages of the embodiments of the utility model clearer, the technical solution of the embodiments of the utility model will be described clearly and completely in the following in conjunction with the accompanying drawings. It is evident that the described embodiments are only some but not all of the embodiments of this utility model. Based on the described embodiments of this utility model, all other embodiments obtainable by an ordinary technician in this field without the need for inventive effort fall within the scope of protection of this utility model.

In the description of this utility model, it is to be understood that terms such as "up", "down", "front", "back", "left", "right", "top", "bottom", "inner", and "outer" indicate orientations or positional relationships that are based on the orientations or positional relationships shown in the accompanying drawings. These terms are used only for the purpose of describing and simplifying the utility model and do not indicate or imply that the device or component referred to must have a particular orientation, be constructed or operated in a particular orientation, and therefore are not to be construed as a limitation of this utility model.

In this utility model, unless otherwise expressly specified and limited, terms such as "mount", "connect", "link", and "fix" should be broadly construed. For example, they can refer to fixed connections, detachable connections, or integral connections. They can involve mechanical connections or electrical connections. They can also refer to direct connection or indirect connection through intermediate media. They can also refer to internal connection between two components. Ordinary technicians in the field can understand the specific meanings of the above-mentioned terms in this utility model based on specific circumstances.

In this utility model, unless otherwise expressly specified and limited, the first feature being "over" or "under" the second feature may include direct contact between the first and second features, or it may include indirect contact between the first and second features through another feature therebetween. Furthermore, the first feature being "above", "on top", and "over" the second feature includes the first feature being directly above and diagonally above the second feature, or simply denotes that a height of the first feature with respect to a horizontal level is higher than that of the second feature. The first feature being "below", "under", and "beneath" the second feature includes the first feature being directly below and diagonally below the second feature, or simply denotes that a height of the first feature with respect to a horizontal level is lower than that of the second feature.

Unless otherwise defined, the technical or scientific terms used herein should have the ordinary meanings understood by a person of ordinary skill in the technical field of this utility model. The use of terms such as "first", "second" and the like in this utility model patent application and the claims does not imply any order, quantity, or importance, but is merely used to distinguish different components. Similarly, terms such as "one" or "a" and the like do not denote a limitation in quantity, but rather denote at least one.

As shown in FIGS. 1-6, an embodiment of this utility model discloses a portable milk warming container, comprising a heating device 1 and a main device 2, wherein the heating device 1 is detachably connected to the main device 2. The heating device 1 comprises a heating casing 11, a first coupling socket 12, and a heating element 13, wherein the first coupling socket 12 and the heating element 13 are arranged inside the heating casing 11, and the heating element 13 is electrically connected to the first coupling socket 12. The aforementioned electrical connection between the heating element 13 and the first coupling socket 12 and further electrical connection as will be specified below can be a wired connection such as a wire or a printed circuit board wire, or a wireless connection such as WiFi® or Bluetooth®. An outer periphery of the heating element 13 is surrounded by the heating casing 11; a heating chamber 14 that can be in contact with liquid such as breast milk, milk powder solution, water, milk, etc. in an external container such as a milk bottle or a water bottle, is provided within a space defined by the heating element 13 and the heating casing 11. Heat generated by the heating element 13 can be conducted to the heating chamber 14 and the liquid inside the external container, thereby heating the liquid. The main device 2 comprises a casing 21 of the main device 2, a second coupling socket 22, a power supply component 23, and a control circuit board 24, wherein the second coupling socket 22, the power supply component 23, and the control circuit board 24 are arranged inside the casing 21 of the main device 2, and the power supply component 23 and the control circuit board 24 are electrically connected to the second coupling socket 22. The first coupling socket 12 and the second coupling socket 22 can be coupled and connected as the heating device 1 is docked with the main device 2, so that the heating element 13 inside the heating casing 11 is electrically connected to the power supply component 23 and the control circuit board 24 inside the casing 21 of the main device 2, enabling the heating element 13 to be powered by the power supply component 23 and controlled by the control circuit board 24 for heating activation and deactivation, heating temperature setting, heating time setting, etc. The first coupling socket 12 and the second coupling socket 22 can be disconnected as the heating device 1 is separated from the main device 2, thereby providing a simple structure and is convenient for docking and detachment for ease of use. The portable milk warming container of this embodiment, due to the detachable connection between the heating device 1 and the main device 2, and the arrangement of electrical components such as the power supply component 23 and the control circuit board 24 inside the casing 21 of the main device 2, allows the heating device 1 to be detached from the main device 2 for separate cleaning or high-temperature sterilization, thereby facilitating deep cleaning of the heating chamber 14 and ensuring safer and more hygienic use.

Figure 4:
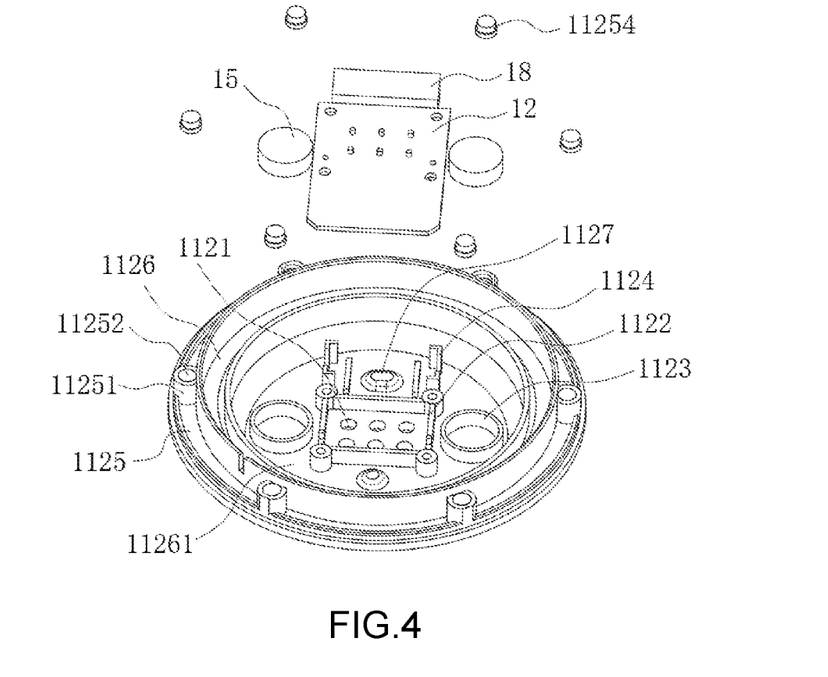
FIG. 4 is a partial structural schematic diagram of the heating device disclosed in an embodiment of this utility model.
Figure 5:
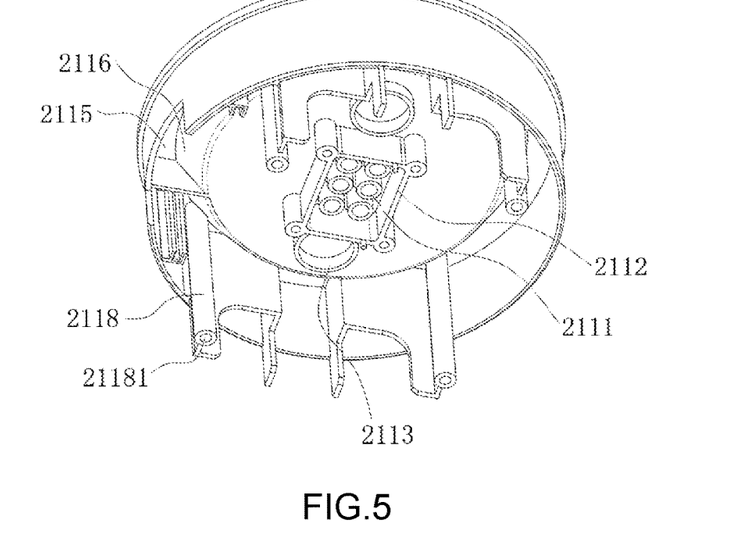
FIG. 5 is a partial structural schematic diagram of the main device disclosed in an embodiment of this utility model.
Figure 6:
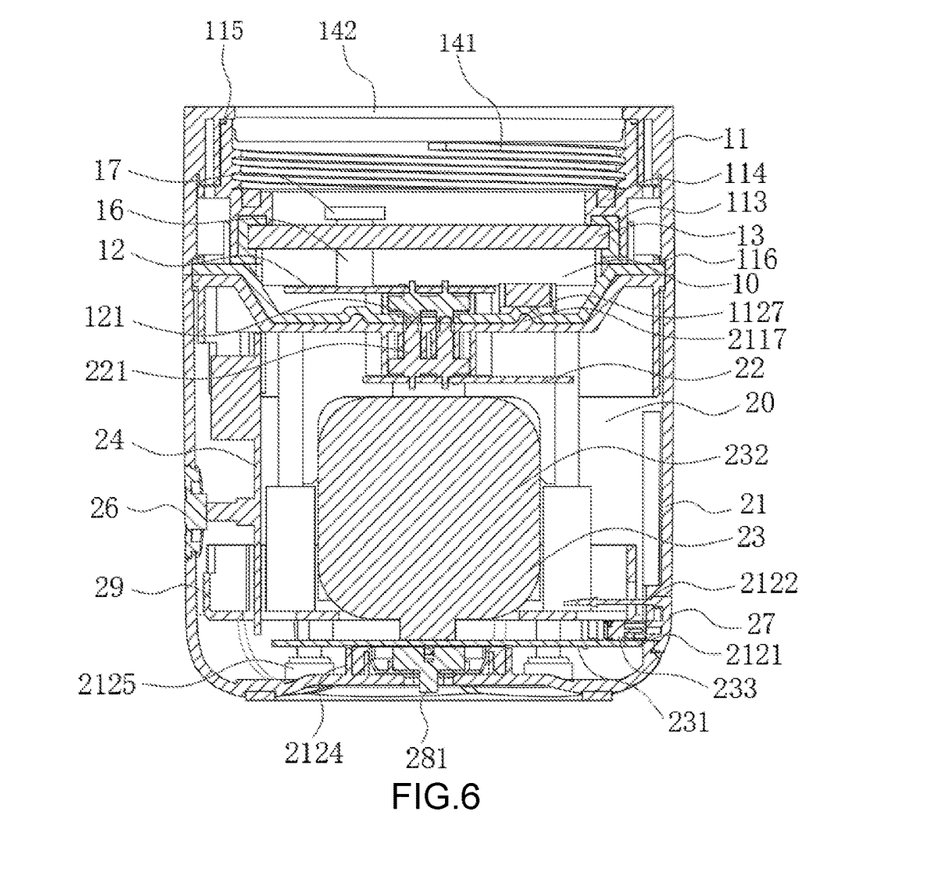
FIG. 6 is a sectional view of the structures of the heating device and the main device disclosed in an embodiment of this utility model.

As shown in FIGS. 4-6, in some specific embodiments, at least one first coupling pin 121 is provided on the first coupling socket 12, and at least one first coupling channel 1121 is penetrated through the heating casing 11 to allow said at least one first coupling pin 121 to pass through. At least one second coupling pin 221 corresponding to said at least one first coupling pin 121 is provided on the second coupling socket 22, and at least one second coupling channel 2111 is penetrated through the casing 21 of the main device 2 to allow said at least one second coupling pin 221 to pass through. When the heating device 1 is connected to the main device 2, the first coupling socket 12 and the second coupling socket 22 are coupled and connected as each first coupling pin 121 engages with a corresponding second coupling pin 221. When the heating device 1 is separated from the main device 2, the first coupling socket 12 and the second coupling socket 22 are disconnected as each first coupling pin 121 disengages from the corresponding second coupling pin 221. In this embodiment, the first coupling socket 12 is configured as a female socket of a pogo pin connector, and each first coupling pin 121 is configured as a female top pin, while the second coupling socket 22 is configured as a male socket of the pogo pin connector, and each second coupling pin 221 is configured as a male top pin. The first coupling socket 12 and the second coupling socket 22 are electrically connected via the male and female top pins. The structure is simple and practical. In other embodiments, the first coupling socket 12 and the second coupling socket 22 can also be respectively configured as coupling sockets of other types of connectors, thereby achieving electrical connection between the heating component 13, the power supply component 23, and the control circuit board 24.

In some specific embodiments, each first coupling pin 121 is sealedly connected to an inner wall of a corresponding first coupling channel 1121, thus improving the sealing performance of the heating device 1. This allows the heating device 1 to be immersed in water for cleaning, facilitating deep cleaning of the heating chamber 14. Each second coupling pin 221 is sealedly connected to an inner wall of a corresponding second coupling channel 2111, thus improving the sealing performance of the main device 2. The main device 2 can be rinsed, and it can prevent the risk of water, milk, and other liquids from being in contact with the electrical components 23 or the control circuit board 24 inside the casing 21 of the main device 2 through the a gap between each second coupling pin 221 and the inner wall of the corresponding second coupling channel 2111 if they were not sealedly connected with each other, thus enhancing safety. It can also prevent dust particles and other impurities from getting inside, making it easier to clean the main device. In this embodiment, the sealed connections between each first coupling pin 121 and the inner wall of the corresponding first coupling channel 1121, and between each second coupling pin 221 and the inner wall of the corresponding second coupling channel 2111 are achieved by gluing, which provides good sealing performance. In other embodiments, equivalent effects can also be achieved through interference fit connection, seal ring, or other sealing methods.

As shown in FIGS. 4 and 5, in some specific embodiments, an inner wall of the heating casing 11 is provided with a first coupling seat 1122 for mounting the first coupling socket 12, and an inner wall of the casing 21 of the main device 2 is provided with a second coupling seat 2112 for mounting the second coupling socket 22, thus facilitating the precise positioning and mounting of the first coupling socket 12 and the second coupling socket 22. The first coupling seat 1122 is arranged near said at least one first coupling channel 1121, and the second coupling seat 2112 is arranged near said at least one second coupling channel 2111, thus facilitating the simultaneous assembly of each first coupling pin 121 with the corresponding first coupling channel 1121 during assembly of the first coupling socket 12 and the first coupling seat 1122, and the assembly of each second coupling pin 221 with the corresponding second coupling channel 2111 during assembly of the second coupling socket 22 and the second coupling seat 2112. In this embodiment, the first coupling seat 1122 is integrally formed with the inner wall of the heating casing 11, so that the first coupling socket 12 is not easily movable relative to the heating casing 11 with the first coupling seat 1122. The second coupling seat 2112 is integrally formed with the inner wall of the casing 21 of the main device 2, so that the second coupling socket 22 is not easily movable relative to the casing 21 of the main device 2 with the second coupling seat 2112, thereby improving the stability of the installation of the first coupling socket 12 and the second coupling socket 22. Certainly, in other embodiments, the first coupling seat 1122 may also be detachably connected to the inner wall of the heating casing 11, or the second coupling seat 2112 may be detachably connected to the inner wall of the casing 21 of the main device 2, which also facilitates the precise positioning and installation of the first coupling socket 12 or the second coupling socket 22.

In some specific embodiments, at least one first magnetic fastener 15 is provided on the heating casing 11, and at least one second magnetic fastener 25 corresponding to said at least one first magnetic fastener 15 is arranged on the casing 21 of the main device 2. The heating device 1 is magnetically connected and docked to the main device 2 via said at least one first magnetic fastener 15 and said at least one second magnetic fastener 25, thereby fixing the heating device 1 on the main device 2 and preventing the heating device 1 from detaching from the main device 2. The heating device 1 is separated from the main device 2 by separating said at least one first magnetic fastener 15 from said at least one second magnetic fastener 25, thus allowing the heating device 1 to quickly dock with or separate from the main device 2, so that operation is simple and convenient. Certainly, in other embodiments, the heating casing 11 and the casing 21 of the main device 2 can also be fixed by other structures such as buckles and Velcro® tapes, which can also prevent the heating device 1 from detaching from the main device 2.

In some specific embodiments, the inner wall of the heating casing 11 is provided with at least one first magnetic fastener seat 1123 for installing said at least one first magnetic fastener 15, and the inner wall of the casing 21 of the main device 2 is provided with a second magnetic fastener seat 2113 for installing said at least one second magnetic fastener 25, thus facilitating precise positioning and installation of each first magnetic fastener 15 and a corresponding second magnetic fastener 25. In this embodiment, the first magnetic fastener seat 1123 is integrally formed with the inner wall of the heating casing 11, so that said at least one first magnetic fastener 15 is not easily moved relative to the heating casing 11 along with the first magnetic fastener seat 1123, and said at least one second magnetic fastener 25 is integrally formed with the inner wall of the casing 21 of the main device 2, so that said at least one second magnetic fastener 25 is not easily moved relative to the casing 21 of the main device 2 along with the second magnetic fastener seat 2113, thereby improving the stability of the installation of said at least one first magnetic fastener 15 and said at least one second magnetic fastener 25. Certainly, in other embodiments, the first magnetic fastener seat 1123 may also be detachably connected to the inner wall of the heating casing 11, or the second magnetic fastener seat 2113 may also be detachably connected to the inner wall of the casing of the main device 21, which also facilitates the precise positioning and installation of said at least one first magnetic fastener 15 or said at least one second magnetic fastener 25.

In some specific embodiments, said at least one first magnetic fastener 15 comprises two first magnetic fasteners, and said at least one first magnetic fastener seat 1123 comprises two first magnetic fastener seats. The two first magnetic fastener seats 1123 are arranged on opposite sides of the first coupling seat 1122 respectively, which improves the stability of the magnetic connection and makes it less likely for the heating device 1 to detach from the main device 2. Certainly, in other embodiments, a quantity of said at least one of first magnetic fastener 15 and a quantity of said at least one of first magnetic fastener seat 1123 can also be three, four, or more, with all first magnetic fastener seats 1123 evenly arranged around the first coupling seat 1122, thus improving the stability of the magnetic connection.

As shown in FIG. 4 and FIG. 6, in some specific embodiments, a temperature sensor 16 is provided on the heating element 13 and electrically connected to the first coupling socket 12. The temperature sensor 16 is configured to detect a temperature of the liquid in the heating chamber 14. When the heating device 1 is docked with the main device 2, the temperature sensor 16 is electrically connected to the control circuit board 24 through the coupling connection between the first coupling socket 12 and the second coupling socket 22, thus facilitating real-time monitoring or control of the heating temperature. Within the heating casing 11, there is also an overheating protector 18, which is electrically connected to the temperature sensor 16, the heating element 13, and the first coupling socket 12. The overheating protector 18 can promptly stop heating when the liquid temperature in the heating chamber 14 reaches a certain value, or in emergency situations, it can promptly cut off power to stop heating, thereby improving the safety of the portable milk warming container. The inner wall of the heating casing 11 is provided with a protector seat 1124 for mounting the overheating protector 18, thus facilitating accurate positioning and mounting of the overheating protector 18. In this embodiment, the protector seat 1124 is integrally formed with the inner wall of the heating casing 11, so that the overheating protector 18 is not easily moved relative to the heating casing 11 along with the protector seat 1124, thus improving the stability of the installation of the overheating protector 18. Certainly, in other embodiments, the protector seat 1124 may also be detachably connected to the inner wall of the heating casing 11, which also facilitates accurate positioning and installation of the overheating protector 18.

In some specific embodiments, a water depletion sensor 17 electrically connected to the first coupling socket 12 is also provided on the heating element 13. The water depletion sensor 17 is used to detect whether water or liquid in the heating chamber 14 is being depleted or not. When the heating device 1 is docked with the main device 2, the water depletion sensor 17 is electrically connected to the control circuit board 24 through the coupling connection of the first coupling socket 12 and the second coupling socket 22, which facilitates timely sensing of water depletion or control of the heating time, etc. The information concerning water depletion can be used to determine in time whether the water or liquid in the heating chamber 14 is dried out or not, so as to turn off heating or cut off power in time when the portable milk warming container is accidentally touched to start the heating operation, thereby improving safety when the milk warming container is carried. In this embodiment, the water depletion sensor 17 is set as a liquid level sensor, and an upper end of the water depletion sensor 17 protrudes from a top surface of the heating element 13, which facilitates detection of the liquid in the heating chamber 14. In some other embodiments, the water depletion sensor 17 can also be set as a weight sensor, a laser sensor, or other sensors capable of detecting water depletion in the heating chamber 14. In this embodiment, the temperature sensor 16 and the water depletion sensor 17 are simultaneously provided, and the temperature sensor 16 and the water depletion sensor 17 are integrally structured, which simplifies the structure and facilitates assembly or disassembly. Certainly, in some other embodiments, the temperature sensor 16 and the water depletion sensor 17 can also be separately provided as independent structures, or only the temperature sensor 16 or the water depletion sensor 17 is provided according to practical requirements.

As shown in FIG. 6, in some specific embodiments, the first coupling socket 12 is arranged below the heating element 13, and each first coupling channel 1121 penetrates through a bottom wall of the heating casing 11. The first coupling seat 1122, said at least one first magnetic fastener seat 1123, and the protector seat 1124 are arranged on an upper side of the bottom wall of the heating casing 11. Each second coupling channel 2111 penetrates through a top wall of the casing 21 of the main device 2, and the second coupling seat 2112 and said at least one second magnetic fastener seat 2113 are arranged on a lower side of the top wall of the casing 21 of the main device 2. After the heating device 1 is docked with the main device 2, the main device 2 supports the bottom of the heating device 1, providing support for the heating device 1. Under the dual action of its own gravity and the magnetic connection between said at least one first magnetic fastener 15 and said at least one second magnetic fastener 25, the heating device 1 is docked with the main device 2, ensuring a stable connection and reducing the likelihood of detachment from the main device 2. In another embodiment of this utility model, the first coupling socket 12 is arranged on one side wall of the heating element 13, and said at least one first coupling channel 1121 penetrates through the side wall of the heating casing 11. The first coupling seat 1122, said at least one first magnetic fastener seat 1123, and the protector seat 1124 are arranged on an inner side of the side wall of the heating casing 11; said at least one second coupling channel 2111 penetrates through a side wall of the casing 21 of the main device 2, and the second coupling seat 2112 and said at least one second magnetic fastener seat 2113 are arranged on an inner side of the side wall of the casing 21 of the main device 2. In this case, the heating device 1 is fixed on the side wall of the main device 2 by the magnetic connection between said at least one first magnetic fastener 15 and said at least one second magnetic fastener 25, thus achieving the coupling connection between the first coupling socket 12 and the second coupling socket 22.

In some specific embodiments, a bottom surface of a first docking platform 1126 is provided with at least one first positioning member 1127. A top surface of a second docking platform 2116 is equipped with at least one second positioning member 2117 corresponding to said at least one first positioning member 1127. The first coupling pins 121 and the corresponding second coupling pins 221 are positioned relative to each other by said at least one first positioning member 1127 and said at least one second positioning member 2117, thereby allowing the first coupling pins 121 to accurately dock with corresponding second coupling pins 221. In this embodiment, each first positioning member 1127 is provided as a chamber structure concaved from the bottom surface of the first docking platform 1126, and said at least one second positioning member 2117 is provided as a protrusion structure convexly formed on the top surface of the second docking platform 2116. The first coupling pins 121 and the corresponding second coupling pins 221 are positioned relative to each other when the chamber structure and the protrusion structure are engaged with each other, thereby facilitating docking or detachment. There are two first positioning members 1127 and two corresponding second positioning members 2117. The two first positioning members 1127 are provided in different shapes, such as one being circular and the other being elliptical. By configuring at different positions and in various shapes of the first positioning members 1127 and the second positioning members 2117, positioning becomes more accurate and stable. The two first positioning members 1127 are arranged on opposite sides along a first direction of the first coupling seat 1122 respectively. The two first magnetic fastener seats 1123 are arranged on opposite sides along a second direction of the first coupling seat 1122 respectively. The first direction and the second direction are perpendicular, thus ensuring stable connection and compact and reasonable spatial arrangement. In other embodiments, a quantity of the first positioning members 1127 and a quantity of the second positioning members 2117 can also be three, four, or even more, all of which can achieve positioning between the first coupling pins 121 and the corresponding second coupling pins 221.

Figure 1:
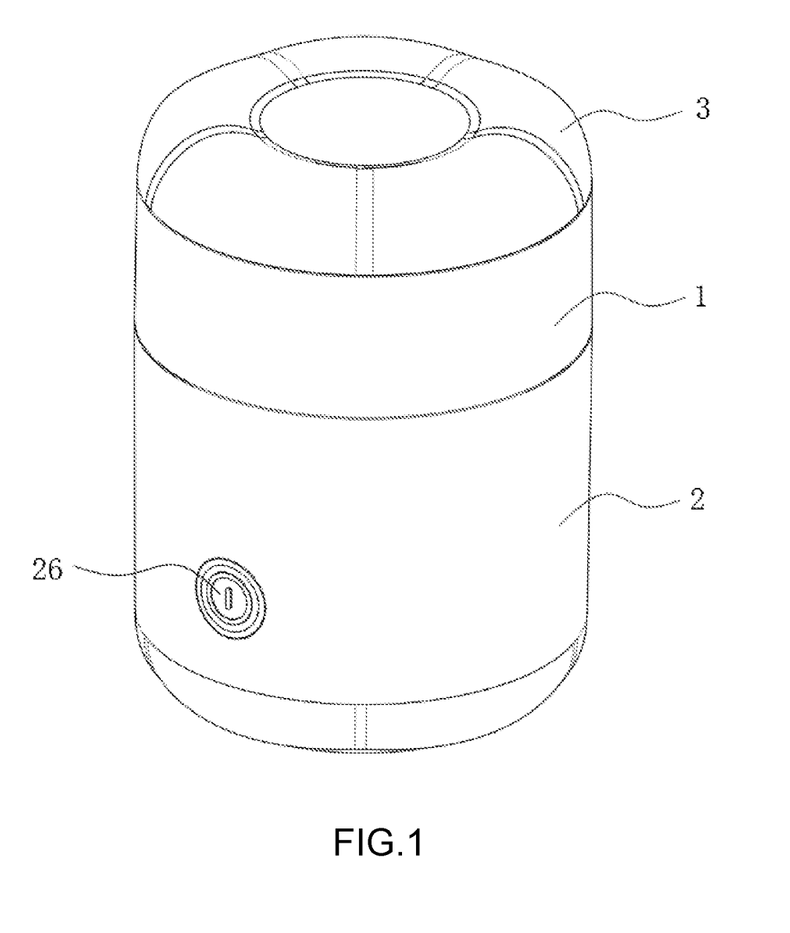
FIG. 1 shows a schematic diagram of the structure of the portable milk warming container disclosed in an embodiment of this utility model.
Figure 2:
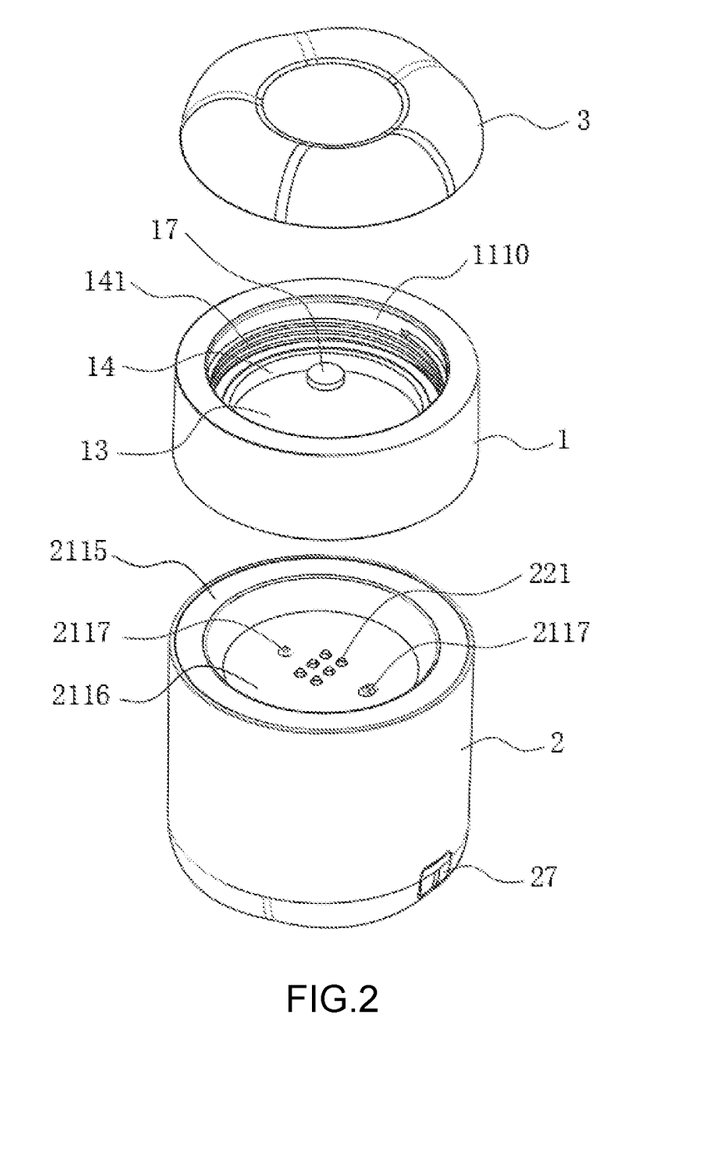
FIG. 2 is an exploded view of the structure of the portable milk warming container disclosed in an embodiment of this utility model.
Figure 3:
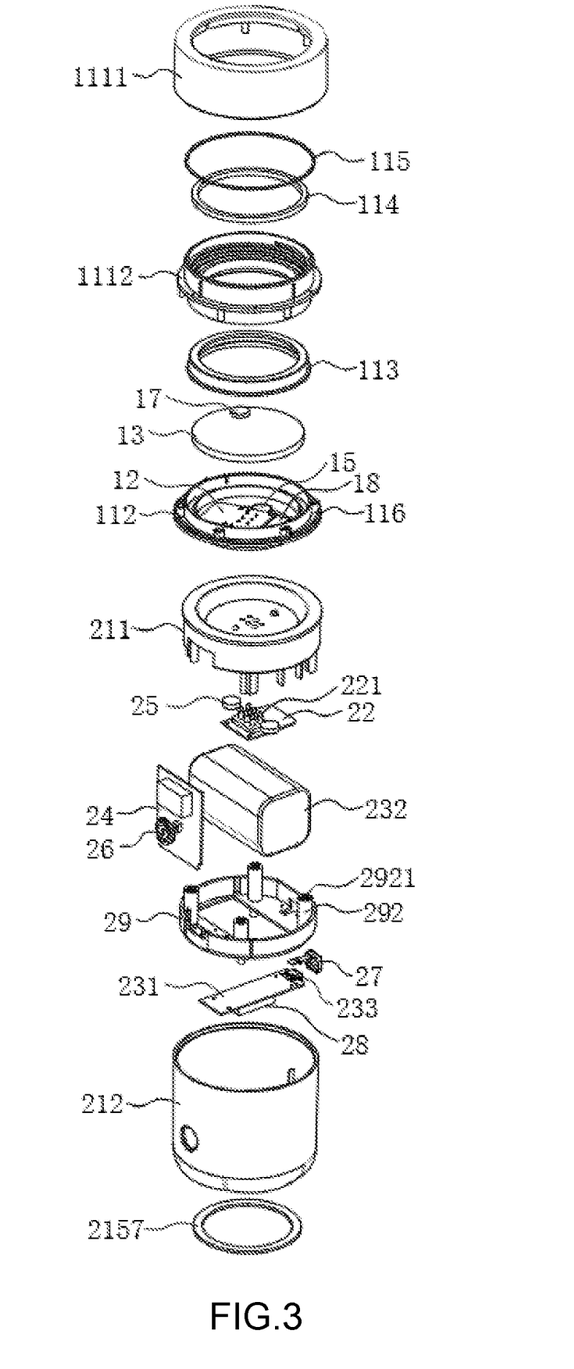
FIG. 3 is a first partial exploded view of the structure of the portable milk warming container disclosed in an embodiment of this utility model.
Figure 7:
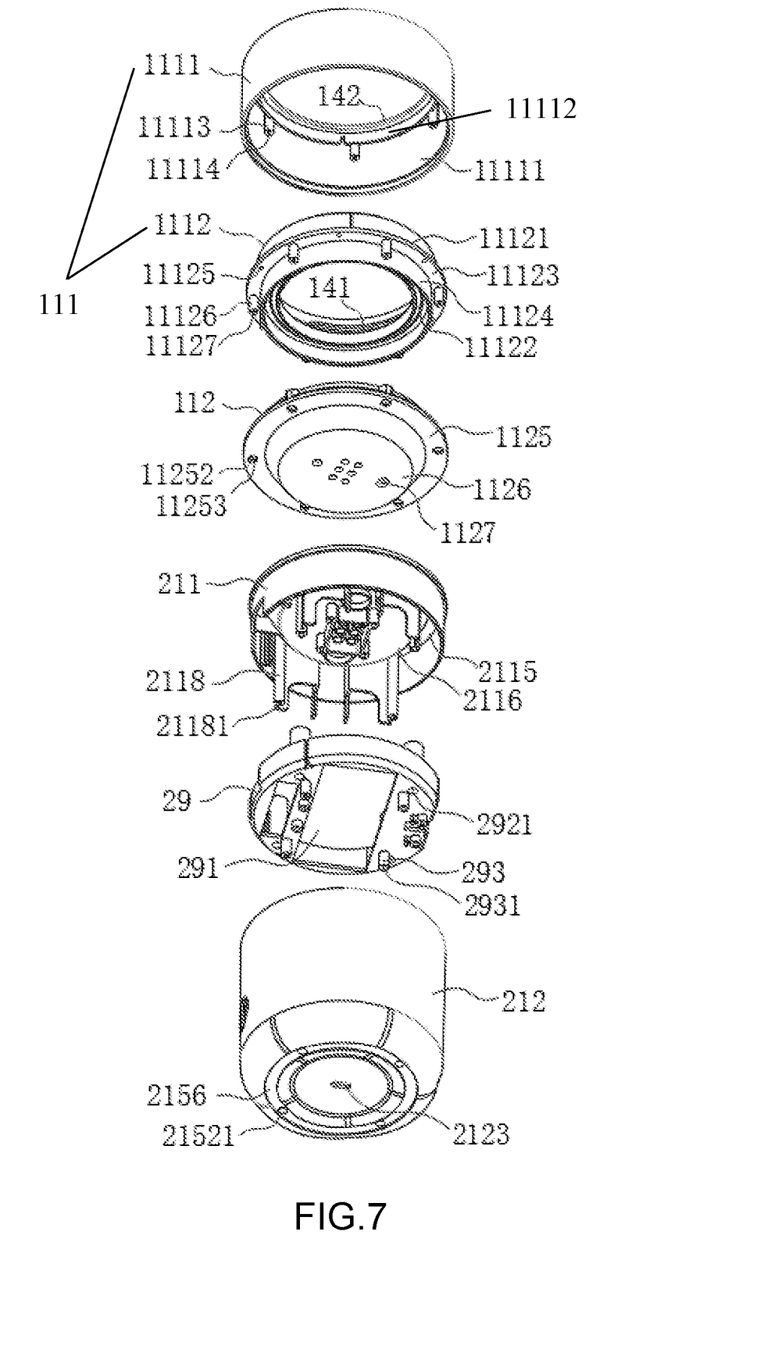
FIG. 7 is a second partial exploded view of the structure of the portable milk warming container disclosed in an embodiment of this utility model.

As shown in FIGS. 2 and 7, in some specific embodiments, the bottom wall of the heating casing 11 comprises a first annular platform 1125 arranged along its periphery and the first docking platform 1126 protruding downwardly from an inner periphery of the first annular platform 1125. The top wall of the casing 21 of the main device 2 comprises a second annular platform 2115 arranged along its periphery and the second docking platform 2116 concavely disposed downward from an inner periphery of the second annular platform 2115. When the heating device 1 is docked with the main device 2, the first annular platform 1125 and the second annular platform 2115 are in full contact, and the first docking platform 1126 is positioned within the second docking platform 2116, thereby further improving the stability of the docking between the heating device 1 and the main device 2. The first coupling seat 1122, said at least one first magnetic fastener seat 1123, and the protector seat 1124 are provided on an upper side of the first docking platform 1126, and the second coupling seat 2112 and said at least one second magnetic fastener seat 2113 are provided on a lower side of the second docking platform 2116, which facilitates precise docking. In this embodiment, the first annular platform 1125 and the second annular platform 2115 are provided as mutually matching annular platform structures. The first docking platform 1126 is provided as a conical platform structure, and the second docking platform 2116 is provided as a conical chamber structure matching the conical platform structure, providing a large contact surface. The structures are simple and practical and it is convenient to carry. In other embodiments, the first annular platform 1125 and the second annular platform 2115 can also be provided as mutually matching square annular platforms, flower-shaped annular platforms, star-shaped annular platforms, circular conical platforms, square conical platforms, flower-shaped conical platforms, star-shaped conical platforms, or structures in other shapes. Alternatively, the first docking platform 1126 can also be provided as circular, square, square conical, flower-shaped, flower-shaped conical, star-shaped, or star-shaped conical platforms, and in such case, the second docking platform 2116 is provided as a circular chamber, square chamber, square conical chamber, flower-shaped chamber, flower-shaped conical chamber, star-shaped chamber, or star-shaped conical chamber structure matching the first docking platform 1126, thus facilitating precise positioning and docking between the heating device 1 and the main device 2.

As another embodiment of this utility model, the bottom wall of the heating casing 11 comprises a first annular platform 1125 arranged along its periphery and the first docking platform 1126 concavely disposed upwardly from an inner periphery of the first annular platform 1125. The top wall of the casing 21 of the main device 2 comprises a second annular platform 2115 arranged along its periphery and the second docking platform 2116 convexly disposed upwardly from an inner periphery of the second annular platform 2115. When the heating device 1 is docked with the main device 2, the first annular platform 1125 and the second annular platform 2115 are in full contact, and the second docking platform 2116 is limited within the first docking platform 1126, thus further improving the stability of the docking between the heating device 1 and the main device 2.

Figure 8:
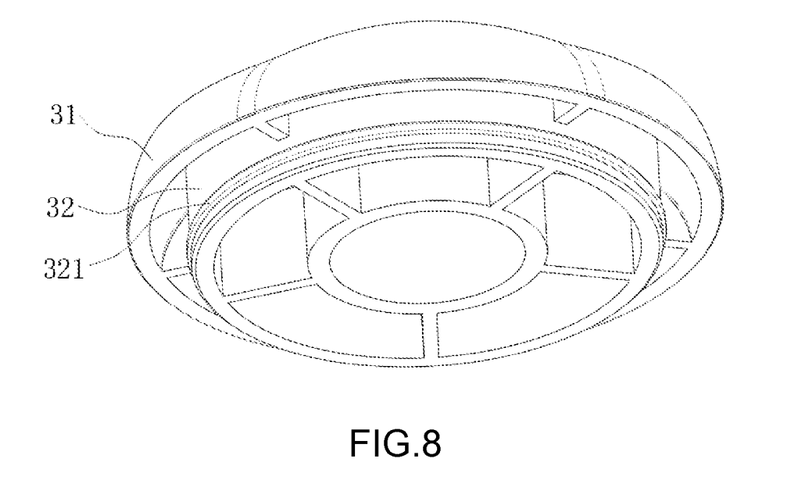
FIG. 8 is a structural schematic diagram of the cover device disclosed in an embodiment of this utility model.

As shown in FIG. 8, in some specific embodiments, the portable milk warming container further comprises a cover device 3 for opening and closing the heating chamber 14. The cover device 3 is used to prevent dust and contamination, thereby ensuring hygiene. The cover device 3 also prevents damage during accidentally started heating process of the portable milk warming container due to keys, mobile phones, or other items in the bag falling into the heating chamber 14. This provides additional safety and convenience for portable use. The cover device 3 can be detachably connected to the heating device 1, facilitating the connection between the heating device 1 and an opening of an external container or an adapter.

In some specific embodiments, the cover device 3 comprises a cover plate 31 and a connecting column 32 extending downwardly from the cover plate 31. An outer peripheral side of the connecting column 32 is provided with a connecting ring edge 321 that protrudes outwardly from the outer peripheral side of the connecting column 32. An inner peripheral side of an upper end of the heating chamber 14 is provided with a limiting ring edge 142 that protrudes inwardly into the heating chamber 14. When the cover device 3 is closed against the heating device 1, the cover plate 31 covers a top surface of the heating casing 11, and the connecting column 32 extends into the heating chamber 14. The connecting ring edge 321 is engaged and connected to a lower side of the limiting ring edge 142, ensuring a stable connection that is not easily detached. In other embodiments, the cover device 3 and the heating device 1 can also be detachably connected by magnetic connection, threaded connection, or other methods. An inner side wall of the heating chamber 14 is provided with a threaded structure 141 that can be detachably connected to the opening of an external container or an adapter. The connection is tight and can easily match with different models of container openings available on the market. Additionally, in other embodiments, the inner side wall of the heating chamber 14 and the opening of the external container or an adapter can be detachably connected by a snap-fit structure or other structures.

As shown in FIG. 7, in some specific embodiments, the heating casing 11 comprises a first casing 111 and a second casing 112 sealedly connected to a lower side of the first casing 111. The first casing 111 is longitudinally provided with a heating channel 1110 that can be detachably connected to an external container opening or an adapter. The longitudinal direction of the heating channel 1110, and longitudinal direction that will be referred to below, is parallel to a central axis of the heating device 1. The external container opening can be directly and detachably connected to the heating channel 1110 or indirectly and detachably connected to the heating channel 1110 via an adapter, thereby accommodating different models of container openings available on the market. The heating chamber 14 is defined by the top surface of the heating element 13 and an inner wall of the heating channel 1110. The bottom surface of the first docking platform 1126 is arranged protruding downwardly relative to the heating element 13. A top surface of the first docking platform 1126 is concavely disposed downwardly to form a receiving chamber 11261. The heating element 13 is clamped and sealed between the first docking platform 1126 and the first casing 111. An inner wall of the receiving chamber 11261 and a bottom surface of the heating element 13 enclose to form a first accommodating chamber 10. The first coupling socket 12, said at least one first magnetic fastener 15, and the overheating protector 18 are arranged in the first accommodating chamber 10. The heating channel 1110 is arranged on the first casing 111. The first docking platform 1126 and the first annular platform 1125 are arranged on the second casing 112. The spatial arrangement is compact and clever.

In some specific embodiments, the first casing 111 comprises a first outer casing 1111 and a first inner casing 1112 disposed inside and sealedly connected to the first outer casing 1111. The first inner casing 1112 comprises a first annular side plate 11121, a first annular bottom plate 11122 connected to a lower inner peripheral side of the first annular side plate 11121, and a second annular bottom plate 11123 connected to a lower outer peripheral side of the first annular side plate 11121. The heating channel 1110 is provided on the first casing 111, and the threaded structure 141 is provided on an inner wall of the first annular side plate 11121. A top wall of the first annular bottom plate 11122 can abut against the opening of an external container or a bottom surface of an adaptor, enabling the first inner casing 1112 to be tightly connected to the opening of the external container or the adaptor. The first outer casing 1111 and the second casing 112 are made of plastic material, while the first inner casing 1112 is made of metal material such as stainless steel. The second annular bottom plate 11123 can be detachably connected to the top of the first outer casing 1111 and the second casing 112. Specifically, the first outer casing 1111 comprises a third annular side plate 11111 and a first annular top plate 11112 connected to an inner upper peripheral side of the third annular side plate 11111. The limiting ring edge 142 is provided on the first annular top plate 11112, and the third annular side plate 11111 is arranged at a spacing from the first annular side plate 11121. The second annular bottom plate 11123 is disposed between the third annular side plate 11111 and the first annular side plate 11121. A lower side of the first annular top plate 11112 is provided with a plurality of first mounting columns 11113 protruding downwardly between the third annular side plate 11111 and the first annular side plate 11121. The second annular bottom plate 11123 is penetrated through by a plurality of second mounting channels 11125 corresponding to a plurality of first mounting channels 11114 provided inside the first mounting columns 11113 respectively. The first inner casing 1112 is firmly connected to the first outer casing 1111 by inserting a plurality of first fasteners (not shown in the drawings) into the second mounting channels 11125 and through the corresponding first mounting channels 11114. After connection, the top of the first annular side plate 11121 is sealedly connected to the first annular top plate 11112. A lower side of the second annular bottom plate 11123 is provided with a plurality of third mounting columns 11126 protruding downwardly between the third annular side plate 11111 and the first annular side plate 11121. An upper side of a first ring platform 1125 is provided with a plurality of fourth mounting columns 11251 protruding upwardly corresponding to the third mounting columns 11126. The fourth mounting columns 11251 and the first ring platform 1125 are provided with a plurality of fourth mounting channels 11252 corresponding to a plurality of third mounting channels 11127 penetrating the third mounting columns 11126. The second casing 112 is firmly connected to the first casing 111 by inserting a plurality of second fasteners (not shown in the drawings) into the fourth mounting channels 11252 and through the corresponding third mounting channels 11127. After connection, the bottom of the third annular side plate 11111 is sealedly connected to the first ring platform 1125, facilitating assembly or disassembly. Bottom ends of the fourth mounting channels 11252 are provided with sealing channels 11253 coaxially arranged with the fourth mounting channels 11252, and sealing blocks 11254 detachably connected to the sealing channels 11253 respectively are provided to improve sealing of the heating device 1. The heating element 13 is sealedly clamped between the lower side of the first annular bottom plate 11122 and the first docking platform 1126 of the second casing 112, and is axially limited by the first annular bottom plate 11122 and the first docking platform 1126, facilitating stable installation of the heating element 13.

In some specific embodiments, the first inner casing 1112 further comprises a second annular side plate 11124 extending downwardly along an outer peripheral side of the first annular bottom plate 11122. The heating element 13 is arranged within the second annular side plate 11124 and is radially limited by the second annular side plate 11124, facilitating stable installation of the heating element 13. A first sealing ring 113 is provided between the heating element 13, the first annular bottom plate 11122, the second annular side plate 11124, and the first docking platform 1126 of the second casing 112. A second sealing ring 114 is provided on the upper side of the first annular bottom plate 11122. A third sealing ring 115 is provided between the top of the first annular side plate 11122 and the first annular top plate 11112 of the first outer casing 1111. A fourth sealing ring 116 is provided between the bottom of the first outer casing 1111 and the first annular platform 1125 of the second casing 112, thereby improving sealing performance of the heating device 1. The first annular bottom plate 11122 is concaved upwardly from its bottom surface to provide a first sealing groove for positioning the first sealing ring 113. The first annular bottom plate 11122 is concaved downwardly from its top surface to provide a second sealing groove for positioning the second sealing ring 114. An outer periphery of the top of the first annular side plate 11122 is concaved downwardly to provide a third sealing groove for positioning the third sealing ring 115. An outer periphery of the top of the first annular platform 1125 is concaved downwardly to provide a fourth sealing groove for positioning the fourth sealing ring 116, thereby improving stable installation of each sealing ring.

In some specific embodiments, the heating element 13 is provided as a ceramic heating plate, while in other embodiments, the heating element 13 can also be provided as an electric heating plate, a silicon conductive heating plate, or other structures with heating functions, all of which can generate heat in the heating chamber 14 and heat up the liquid inside the external container.

As shown in FIG. 7, in some specific embodiments, the casing 21 of the main device 2 comprises a third casing 211 and a fourth casing 212 sealedly connected to a lower side of the third casing 211. The third casing 211 and the fourth casing 212 together form a second accommodating chamber 20. The second coupling socket 22, the power supply component 23, the control circuit board 24, said at least one second magnetic fastener 25, and a protection switch socket 28 are arranged in the second accommodating chamber 20. The second docking platform 2116 and the second annular platform 2115 are arranged on the third casing 211. A control button 26, a charging channel 2121, a cover channel 2122, a switch channel 2123, and a switch seat 2124 are arranged on the fourth casing 212. A mounting bracket 29 can be detachably connected to a bottom wall of the third casing 211 and to the fourth casing 212 respectively. Specifically, a plurality of fifth mounting columns 2118 are provided on the third casing 211 protruding downwardly below the second annular platform 2115, and a plurality of fifth mounting columns 292 corresponding to the fifth mounting columns 2118 are provided protruding upwardly on the mounting bracket 29. A sixth mounting channel 2921 corresponding to a fifth mounting channel 21181 inside each fifth mounting column 2118 is arranged penetrating each fifth mounting column 292. The mounting bracket 29 and the third casing 211 are fastened through a plurality of third fastening components (not shown in the drawings) extending into the sixth mounting channels 2921 and through the corresponding fifth mounting channels 21181. After connection, a power storage device 232 and the control circuit board 24 are clamped between the third casing 211 and the mounting bracket 29. The second coupling socket 22 is arranged between the second docking platform 2116 and the power storage device 232. A plurality of sixth mounting columns 293 are provided protruding downwardly from the mounting bracket 29, and a plurality of eighth mounting columns 2125 corresponding to the sixth mounting columns 293 are provided protruding upwardly on a bottom wall of the fourth casing 212. An eighth mounting channel 21521 corresponding to a seventh mounting channel 2931 inside each sixth mounting column 293 is arranged penetrating each eighth mounting column 2125, and the fourth casing 212 and the mounting bracket 29 are fastened through a plurality of fourth fastening components (not shown in the drawing) penetrating the eighth mounting channels 21521 and the corresponding seventh mounting channels 2931. After connection, the top of the side wall of the fourth casing 212 is sealedly connected to the second annular platform 2115 for easy assembly or disassembly. The bottom wall of the fourth casing 212 is concaved upwardly from its bottom surface and is provided with a sealing ring groove 2156 connected to the eighth mounting channels 21521. The sealing ring groove 2156 is detachably connected to a sealing ring 2157. A fifth sealing ring is provided between the side wall of the fourth casing 212 and the second ring platform 2115 to improve the sealing effect of the main device 2. The bottom surface of the sealing ring 2157 can also come into contact with a surface of a desktop or other medium, providing an anti-slip function.

Finally, it should be noted that the above embodiments are only intended to illustrate the technical solution of this utility model, rather than to limit it. Although detailed description of this utility model have been provided by referring to the above embodiments, the ordinary technicians in this field of art should understand that modifications can still be made to the technical solutions described in the above embodiments, or certain technical features can be equivalently replaced. However, such modifications or replacements shall not depart from the essence of the technical solutions of the embodiments of this utility model.

In summary, the above description is only exemplary embodiments of this utility model. Any equivalent changes and modifications made within the scope of the claims of this utility model shall be deemed to be within the scope of this utility model.

What is claimed is:

1. A portable milk warming container, comprising a main device and a heating device detachably connected to the main device, wherein said heating device comprises a heating casing, a heating element arranged inside the heating casing, and a first coupling socket electrically connected to the heating element; an outer periphery of said heating element is surrounded by the heating casing; a heating chamber configured to be in contact with liquid inside an external container during use is provided within a space defined by the heating element and the heating casing;

said main device comprises a casing of the main device, a power supply component, a control circuit board, and a second coupling socket electrically connected to the power supply component and the control circuit board inside the casing of the main device; said first coupling socket and the second coupling socket are coupled and connected when the heating device is docked with the main device, and are disconnected when the heating device is separated from the main device;

said first coupling socket is provided with at least one first coupling pin, and at least one first coupling channel penetrates through the heating casing, and each first coupling channel is passed through by a corresponding first coupling pin; said second coupling socket is provided with at least one second coupling pin corresponding to said at least one first coupling pin; at least one second coupling channel penetrates through the casing of the main device, and each second coupling channel is passed through by a corresponding second coupling pin;

when the heating device is docked with the main device, the first coupling socket and the second coupling socket are coupled together as each first coupling pin is in contact with a corresponding second coupling pin; when the heating device is separated from the main device, the first coupling socket and the second coupling socket are disconnected as each first coupling pin is separated from a corresponding second coupling pin.

2. The portable milk warming container according to claim 1, wherein each first coupling pin is sealedly connected to an inner wall of a corresponding first coupling channel, and an inner wall of the heating casing is provided with a first coupling seat for mounting the first coupling socket; each second coupling pin is sealedly connected to an inner wall of a corresponding second coupling channel, and an inner wall of the casing of the main device is provided with a second coupling seat for mounting the second coupling socket.

3. The portable milk warming container according to claim 2, wherein said heating casing is provided with at least one first magnetic fastener; said casing of the main device is provided with at least one second magnetic fastener corresponding to said at least one first magnetic fastener; the heating device and the main device are docked as said first magnetic fastener is magnetically connected to said at least one second magnetic fastener.

4. The portable milk warming container according to claim 3, wherein the inner wall of the said heating casing is provided with at least one first magnetic fastener seat for mounting said at least one first magnetic fastener; the inner wall of the casing of the main device is provided with at least one second magnetic fastener seat for mounting said at least one second magnetic fastener; said at least one first magnetic fastener comprises at least two first magnetic fasteners, and said at least one first magnetic fastener seat comprises at least two first magnetic fastener seats corresponding to said at least two first magnetic fasteners, and said at least two first magnetic fastener seats are evenly arranged around the first coupling seat.

5. The portable milk warming container according to claim 4, wherein said heating element is provided with a temperature sensor electrically connected to the first coupling socket; said temperature sensor is configured to detect a temperature of a liquid in the heating chamber; and/or said heating element is provided with a water depletion sensor electrically connected to the first coupling socket; said water depletion sensor is configured to detect depletion of the liquid in the heating chamber.

6. The portable milk warming container according to claim 5, wherein said first coupling socket is arranged underneath the heating element; said at least one first coupling channel penetrates through a bottom wall of the heating casing; said first coupling seat and said at least one first magnetic fastener seat are arranged on an upper side of the bottom wall of the heating casing; said at least one second coupling channel penetrates through a top wall of the casing of the main device; said second coupling seat and said at least one second magnetic fastener seat are arranged on a lower side of the top wall of the casing of the main device.

7. The portable milk warming container according to claim 6, wherein the bottom wall of the heating casing comprises a first annular platform arranged along a periphery thereof, and a first docking platform protruding downwardly from an inner circumference of the first annular platform; the top wall of the casing of the main device comprises a second annular platform arranged along a periphery thereof, and a second docking platform concaved downwardly from an inner circumference of the second annular platform; when the heating device is docked with the main device, the first annular platform and the second annular platform are in full contact, and the first docking platform is limited within the second docking platform; the first coupling seat and said at least one first magnetic fastener seat are arranged on an upper side of the first docking platform, and the second coupling seat and said at least one second magnetic fastener seat are arranged on a lower side of the second docking platform; or the bottom wall of said heating casing comprises a first annular platform arranged along a periphery thereof, and a first docking platform concaved upwardly from an inner circumference of the first annular platform; the top wall of the casing of the main device comprises a second annular platform arranged along a periphery thereof, and a second docking platform protruding upwardly from an inner circumference of the second annular platform; when the heating device is docked with the main device, the first annular platform and the second annular platform are in full contact, and the second docking platform is limited within the first docking platform; the first coupling seat and said at least one first magnetic fastener seat are arranged on an upper side of the first docking platform, and the second coupling seat and said at least one second magnetic fastener seat are arranged on a lower side of the second docking platform.

8. The portable milk warming container according to claim 7, further comprising a cover device for opening and closing the heating chamber; said cover device is detachably connected to the heating device.

9. The portable milk warming container according to claim 8, wherein said cover device comprises a cover plate and a connecting column extending downwardly from the cover plate; said connecting column is provided with a connecting ring edge projecting outwardly from an outer peripheral side of the connecting column, and an inner peripheral side of an upper end of the heating chamber is provided with a limiting ring edge that protrudes inwardly into the heating chamber; said cover plate covers a top surface of the heating casing when the cover device is closed against the heating device; the connecting column extends into the heating chamber, and the connecting ring edge is connected to a lower side of the limiting ring edge by snap-fit connection;

an inner side wall of the heating chamber is provided with a threaded structure configured to be removably connected to an external container opening or an adapter.

10. The portable milk warming container according to claim 1, wherein said heating casing is provided with at least one first magnetic fastener; said casing of the main device is provided with at least one second magnetic fastener corresponding to said at least one first magnetic fastener; the heating device and the main device are docked as said first magnetic fastener is magnetically connected to said at least one second magnetic fastener.

11. The portable milk warming container according to claim 10, wherein an inner wall of the heating casing is provided with at least one first magnetic fastener seat for mounting said at least one first magnetic fastener; an inner wall of the casing of the main device is provided with at least one second magnetic fastener seat for mounting said at least one second magnetic fastener; said at least one first magnetic fastener comprises at least two first magnetic fasteners, and said at least one first magnetic fastener seat comprises at least two first magnetic fastener seats corresponding to said at least two first magnetic fasteners, and said at least two first magnetic fastener seats are evenly arranged around the first coupling seat.

12. The portable milk warming container according to claim 11, wherein a bottom wall of the heating casing comprises a first annular platform arranged along a periphery thereof, and a first docking platform protruding downwardly from an inner circumference of the first annular platform; a top wall of the casing of the main device comprises a second annular platform arranged along a periphery thereof and a second docking platform concaved downwardly from an inner circumference of the second annular platform; when the heating device is docked with the main device, the first annular platform and the second annular platform are in full contact, and the first docking platform is limited within the second docking platform; the first coupling seat and said at least one first magnetic fastener seat are arranged on an upper side of the first docking platform, and the second coupling seat and said at least one second magnetic fastener seat are arranged on a lower side of the second docking platform; or a bottom wall of said heating casing comprises a first annular platform arranged along a periphery thereof, and a first docking platform concaved upwardly from an inner circumference of the first annular platform; a top wall of the casing of the main device comprises a second annular platform arranged along a periphery thereof, and a second docking platform protruding upwardly from an inner circumference of the second annular platform; when the heating device is docked with the main device, the first annular platform and the second annular platform are in full contact, and the second docking platform is limited within the first docking platform; the first coupling seat and said at least one first magnetic fastener seat are arranged on an upper side of the first docking platform, and the second coupling seat and said at least one second magnetic fastener seat are arranged on a lower side of the second docking platform.

13. The portable milk warming container according to claim 1, wherein said heating element is provided with a temperature sensor electrically connected to the first coupling socket; said temperature sensor is configured to detect a temperature of a liquid in the heating chamber; said heating casing is also provided with an overheating protector electrically connected to the temperature sensor, the heating element and the first coupling socket; an inner wall of the heating casing is provided with a protector seat for mounting the overheating protector; and/or said heating element is provided with a water depletion sensor electrically connected to the first coupling socket; said water depletion sensor is configured to detect depletion of the liquid in the heating chamber.

14. The portable milk warming container according to claim 2, wherein said first coupling socket is arranged underneath the heating element; said at least one first coupling channel penetrates through a bottom wall of the heating casing, and the said first coupling seat is arranged on an upper side of the bottom wall of the heating casing; said at least one second coupling channel penetrates through a top wall of the casing of the main device, and the said second coupling seat is arranged on a lower side of the top wall of the casing of the main device.

15. The portable milk warming container according to claim 14, wherein the bottom wall of the heating casing comprises a first annular platform arranged along a periphery thereof, and a first docking platform protruding downwardly from an inner circumference of the first annular platform; the top wall of the casing of the main device comprises a second annular platform arranged along a periphery thereof, and a second docking platform concaved downwardly from an inner circumference of the second annular platform; when the heating device is docked with the main device, the first annular platform and the second annular platform are in full contact, and the first docking platform is limited within the second docking platform; the first coupling seat and said at least one first magnetic fastener seat are arranged on an upper side of the first docking platform, and the second coupling seat and said at least one second magnetic fastener seat are arranged on a lower side of the second docking platform; or the bottom wall of the heating casing comprises a first annular platform arranged along a periphery thereof, and a first docking platform concaved upwardly from an inner circumference of the first annular platform; the top wall of the casing of the main device comprises a second annular platform arranged along a periphery thereof, and a second docking platform protruding upwardly from an inner circumference of the second annular platform; when the heating device is docked with the main device, the first annular platform and the second annular platform are in full contact, and the second docking platform is limited within the first docking platform; the first coupling seat and said at least one first magnetic fastener seat are arranged on an upper side of the first docking platform, and the second coupling seat and said at least one second magnetic fastener seat are arranged on a lower side of the second docking platform.

16. The portable milk warming container according to claim 1, further comprising a cover device for opening and closing the heating chamber, and said cover device is detachably connected to the heating device.

17. The portable milk warming container according to claim 16, wherein said cover device comprises a cover plate and a connecting column extending downwardly from the cover plate; said connecting column is provided with a connecting ring edge projecting outwardly from an outer peripheral side of the connecting column, and an inner peripheral side of an upper end of the heating chamber is provided with a limiting ring edge that protrudes inwardly into the heating chamber; said cover plate covers a top surface of the heating casing when the cover device is closed against the heating device; the connecting column extends into the heating chamber, and the connecting ring edge is connected to a lower side of the limiting ring edge by snap-fit connection;

an inner side wall of the heating chamber is provided with a threaded structure configured to be removably connected to an external container opening or an adapter.

18. The portable milk warming container according to claim 10, further comprising a cover device for opening and closing the heating chamber; said cover device is detachably connected to the heating device.

19. The portable milk warming container according to claim 13, further comprising a cover device for opening and closing the heating chamber; said cover device is detachably connected to the heating device.

\* \* \* \* \*